US011416662B1

(12) United States Patent
Armato et al.

(10) Patent No.: US 11,416,662 B1
(45) Date of Patent: Aug. 16, 2022

(54) ESTIMATING DIAGNOSTIC COVERAGE IN IC DESIGN BASED ON STATIC COI ANALYSIS OF GATE-LEVEL NETLIST AND RTL FAULT SIMULATION

(71) Applicant: CADENCE DESIGN SYSTEMS, INC., San Jose, CA (US)

(72) Inventors: Antonino Armato, Milan (IT); Francesco Lertora, S. Colombano C. (IT); Alessandra Nardi, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 399 days.

(21) Appl. No.: 16/737,257

(22) Filed: Jan. 8, 2020

(51) Int. Cl.
*G06F 30/3308* (2020.01)
*G06F 30/327* (2020.01)
*G06F 30/398* (2020.01)

(52) U.S. Cl.
CPC ........ *G06F 30/3308* (2020.01); *G06F 30/327* (2020.01); *G06F 30/398* (2020.01)

(58) Field of Classification Search
CPC ... G06F 30/3038; G06F 30/327; G06F 30/398
USPC ............................. 716/106, 111, 136; 703/14
See application file for complete search history.

(56) References Cited

U.S. PATENT DOCUMENTS

| | | | | |
|---|---|---|---|---|
| 7,788,561 | B2* | 8/2010 | Huang | G01R 31/318569 714/37 |
| 8,875,077 | B1* | 10/2014 | O'Riordan | G06F 30/367 716/112 |
| 11,144,688 | B1* | 10/2021 | Ershov | G06F 30/398 |
| 11,216,606 | B1* | 1/2022 | Turbovich | G06F 30/3308 |
| 2002/0152447 | A1* | 10/2002 | Venugopal | G06F 30/367 716/112 |
| 2006/0041417 | A1* | 2/2006 | Palladino | G06F 11/261 714/E11.167 |
| 2010/0107131 | A1* | 4/2010 | Bjesse | G06F 30/3323 716/106 |

(Continued)

OTHER PUBLICATIONS

Tabacaru, "On Fault-Effect Analysis at the Virtual-Prototype Abstraction Level", Technische Universitat Munchen, Apr. 3, 2019, 153 pages. (Year: 2019).*

(Continued)

*Primary Examiner* — Phallaka Kik
(74) *Attorney, Agent, or Firm* — Foley & Lardner LLP

(57) ABSTRACT

Embodiments disclosed herein describe systems, methods, and products for safety verification of an IC design. A computer executing an illustrative EDA tool may perform a static cone of influence (COI) analysis of a gate-level netlist of the IC design to determine whether faults injected at combinational logic at different COIs are safe or dangerous. The computer may leverage this determination to perform a register-transfer level (RTL) simulation by generating and injecting equivalent faults to sequential logic in the IC design. The computer may further flexibly allow RTL simulations under different assumptions based upon downstream observability of the faults injected to the sequential logic. Because, RTL simulations are significantly faster than the gate-level simulations, the computer may efficiently calculate DC of one or more safety mechanism in the IC design.

20 Claims, 5 Drawing Sheets

(56) References Cited

U.S. PATENT DOCUMENTS

| | | | | |
|---|---|---|---|---|
| 2010/0107132 A1* | 4/2010 | Bjesse | ................ | G06F 30/3323 |
| | | | | 716/116 |
| 2012/0079442 A1* | 3/2012 | Akar | .................... | G06F 30/398 |
| | | | | 716/112 |
| 2013/0007684 A1* | 1/2013 | Kramer | ................ | G06F 30/398 |
| | | | | 716/112 |
| 2014/0310670 A1* | 10/2014 | Oberai | .................. | G06F 30/398 |
| | | | | 716/112 |
| 2018/0149698 A1* | 5/2018 | Goel | ............. | G01R 31/318525 |
| 2018/0364306 A1* | 12/2018 | Pillay | .................. | G06F 30/3323 |
| 2019/0042682 A1* | 2/2019 | Gerth | .................... | G06F 30/367 |
| 2019/0050307 A1* | 2/2019 | Locker | ................ | G06F 30/327 |
| 2019/0095298 A1* | 3/2019 | Fricano | ............. | G01R 31/2846 |
| 2019/0227915 A1* | 7/2019 | Anandh | ................ | G06F 30/331 |
| 2020/0065234 A1* | 2/2020 | Letombe | ............. | G06F 11/3684 |

OTHER PUBLICATIONS

Prabhu, "Techniques for Enhancing Test and Diagnostic of Digital Circuits", Virginia Polytechnic Institute and State University, Dec. 9, 2014, 137 pages. (Year: 2014).*

Smith, "Win on the fault campaign trail with formal", https://www.techdesignforums.com/practice/technique/iso-26262-formal-fault-strategy, Dec. 11, 2018, 6 pages. (Year: 2018).*

* cited by examiner

| COI FAULTS | $FF_{c1}$ = 1'b1 | $FF_{c1}$ = 1'b0 |
|---|---|---|
| a/sa0 | SAFE | SAFE |
| a/sa1 | DANGEROUS | SAFE |
| b/sa0 | SAFE | SAFE |
| b/sa1 | SAFE | SAFE |
| c/sa0 | DANGEROUS | DANGEROUS |
| c/sa1 | DANGEROUS | DANGEROUS |
| d/sa0 | SAFE | DANGEROUS |
| d/sa1 | DANGEROUS | DANGEROUS |
| e/sa0 | DANGEROUS | DANGEROUS |
| e/sa1 | DANGEROUS | SAFE |
| f/sa0 | DANGEROUS | DANGEROUS |
| f/sa1 | DANGEROUS | DANGEROUS |
| g/sa0 | DANGEROUS | DANGEROUS |
| g/sa1 | DANGEROUS | DANGEROUS |

ESTIMATING DIAGNOSTIC COVERAGE IN IC DESIGN BASED ON STATIC COI ANALYSIS OF GATE-LEVEL NETLIST AND RTL FAULT SIMULATION

TECHNICAL FIELD

This application is generally directed to estimating diagnostic coverage in an integrated circuit (IC) design, and more specifically towards estimating diagnostic coverage of a safety mechanism in the IC design based upon a static cone of influence (COI) analysis of gate-level netlist of the IC design and a subsequent register-transfer level (RTL) fault simulation using the cone of influence analysis.

BACKGROUND

Modern semiconductor based integrated circuits (ICs) are incredibly complex and contain millions of circuit devices and millions of interconnections between the circuit devices. Designing such complex circuits cannot be accomplished manually, and circuit designers use computer based Electronic Design Automation (EDA) tools for synthesis, debugging, and functional verification of the ICs. EDA tools provide various functionality to facilitate different processes for IC design. One of the processes that EDA tools facilitate is estimating diagnostic coverage (DC) in an IC design. DC is generally defined as a metric indicating effectiveness of fault diagnostic applied in a system, such as an IC. Mathematically, DC is a ratio of a number of faults detected by the fault diagnostic (e.g., by a safety mechanism) to the total number of faults. A fault is generally undesired behavior within an IC, e.g., an unknown logic state. A fault may occur in an IC due to external factors such as radiation changing a logic state of a transistor or due to internal design defects in the IC.

For ICs deployed in critical use cases, functional safety is a fundamental requirement to guarantee a tolerable level of risk. For example, an electronic control unit (formed by one or more ICs) in an automobile may have to be fault tolerant to detect and notify/rectify faults within boundary conditions defined by the level of risk. An undetected fault may unduly compromise the safety of an IC and may even be catastrophic. Currently, there are two standards defining the tolerable level of risks: IEC 61508 for the general electronics and ISO 26262 specifically for automobiles. Quantitatively, safety is measured by metrics calculated through FMEDA (Failure Modes Effects and Diagnostic Analysis). IC designs therefore may have to confirm to these safety standards.

Specifically, in the context of automobiles, safety mechanisms (e.g., detection circuits, alarm generating circuits) are deployed in the ICs to reach the ASIL (Automotive Safety Integrity Level) target. Safety mechanisms with metrics reaching/exceeding the ASIL target reduce the risk of potential hazards in the event of system failures. For such safety mechanism, an EDA tool may not only perform a functional verification but also perform safety verification: the goal is to assess not only conformity to functional specifications but also how the safety mechanisms manage faulty behaviors caused by random defects. One safety verification technique includes deliberately injecting faults in an IC design and assessing DC metric and timing dependability performance of the IC design under the injected faults. Assessing the DC metric and timing dependability performance generally includes observing the IC design simulating a propagation the injected faults. The DC metric quantitatively indicates whether the simulated propagation behavior of IC design vis-à-vis the injected faults meets safety targets according to standards such as IEC 61508 and ISO 26262.

However, conventional techniques of fault simulation and subsequent DC calculation is inefficient, restrictive, and less accurate. Fault simulation is conventionally performed on a gate-level netlist. A gate-level netlist has significantly large simulation length particularly for complex IC designs. The problem of a large simulation length is compounded when different combinations of faults have to be simulated to ensure the exhaustive verification of an IC design under fault conditions. Furthermore, conventional fault simulations are generally directed to a particular fault models and the DC calculations are restricted by the underlying assumptions in those fault models. Conventional statistical techniques for fault simulation are either restricted to a fixed confidence level or may have a large margin of error that has to be compensated manually using expert judgment. The conventional statistical techniques are therefore less accurate requiring a manual modification of the estimates.

As such, a significant improvement upon fault simulation and estimation of DC for fault tolerant IC designs is therefore desired.

SUMMARY

What is therefore desired are significantly improved EDA tools (also referred to as EDA systems) that efficiently perform fault simulation and calculate DC of an IC design. What is further desired are EDA tools that are not restricted to a particular fault simulation model. What is also desired are EDA tools that perform a more accurate calculation of DC of an IC design.

Embodiments disclosed herein attempt to solve the aforementioned technical problems and may provide other benefits as well. A computer executing an illustrative EDA tool may perform a static cone of influence (COI) analysis of a gate-level netlist of an IC design to determine whether faults injected at combinational logic at different COIs are safe or dangerous. The computer may leverage this determination to perform a register-transfer level (RTL) simulation by generating and injecting equivalent faults to sequential logic in the IC design. The computer may further flexibly allow RTL simulations under different assumptions based upon downstream observability of the faults injected to the sequential logic. Because, RTL simulations are significantly faster than the gate-level simulations, the computer may efficiently calculate DC of one or more safety mechanism in the IC design.

In an embodiment, a computer implemented method comprises performing, by a computer, a static cone of influence analysis on a gate-level netlist of an IC design to generate a fault-list for sequential logic devices of the IC design; simulating, by the computer, the IC design at register-transfer level by injecting faults from the fault-list into the sequential logic devices to determine corresponding observability of the injected faults with respect to the detection points (detectability) that are the alarms of the safety mechanism; and calculating, by the computer, a diagnostic coverage of a safety mechanism in the IC design based upon the determined observability of the injected faults during the register-transfer level simulation.

In another embodiment, a system comprises a non-transitory storage medium storing a plurality of computer program instructions; a processor electrically coupled to the non-transitory storage medium and configured to execute the plurality of computer program instructions to: perform a static cone of influence analysis on a gate-level netlist of an IC design to generate a fault-list for sequential logic devices of the IC design; simulate the IC design at register-transfer level by injecting faults from the fault-list into the sequential logic devices to determine corresponding observability of the injected faults with respect to the detection points (detectability) that are the alarms of the safety mechanism; and calculate a diagnostic coverage of a safety mechanism in the IC design based upon the determined observability of the injected faults during the register-transfer level simulation.

BRIEF DESCRIPTION OF THE DRAWINGS

The accompanying drawings constitute a part of this specification and illustrate an embodiment of the subject matter described herein.

DETAILED DESCRIPTION

Figure 1:
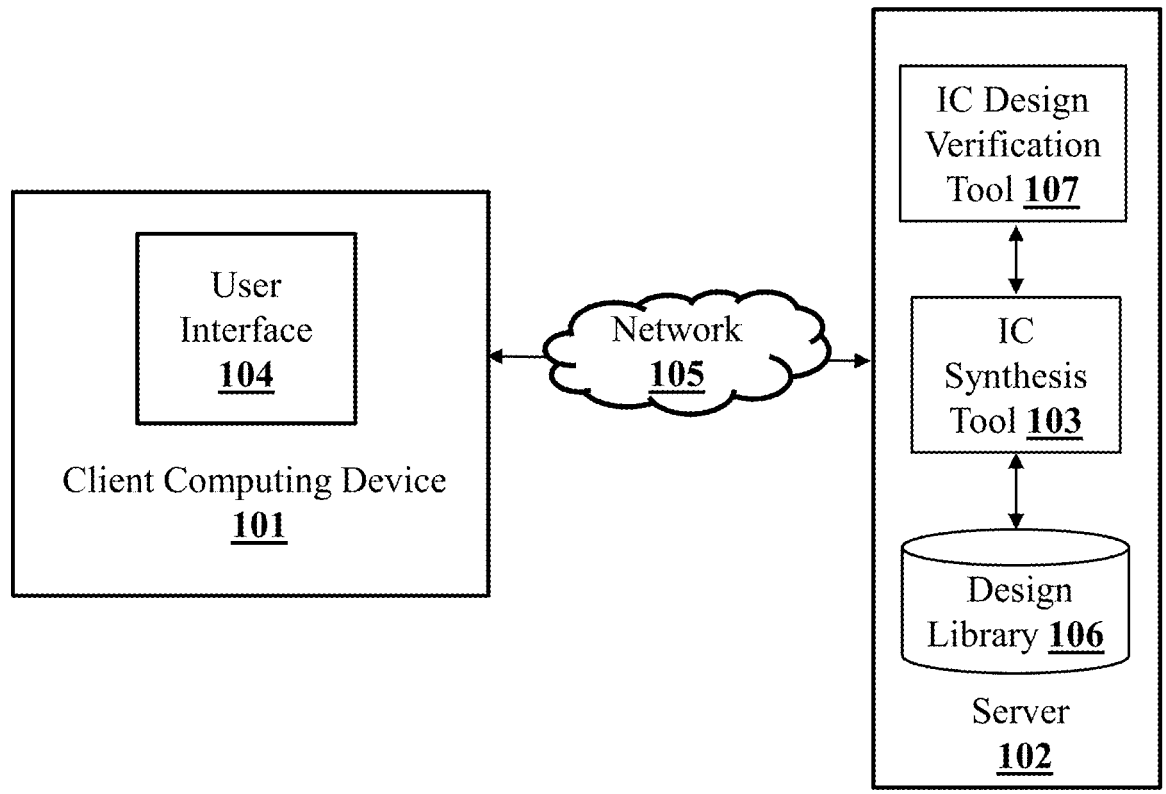
FIG. 1 shows an illustrative electronic design automation system for safety verification of an IC design, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for an efficient, flexible, and an accurate calculation of diagnostic coverage (DC) of a safety mechanism of an IC design. A computer executing an illustrative EDA tool may first perform static cone of influence (COI) analysis of a gate-level netlist of an IC design. Based upon the static analysis, the computer may generate fault-list for sequential logic devices (e.g., flip-flops) and observability tables indicating whether the faults in the fault-list are safe or dangerous. The computer may then perform an RTL simulation of the IC design injecting the faults into the sequential logic devices. The injection of the faults is based upon the approximation that controllability of fault injection at combinational logic devices in COIs of the sequential logic devices is equivalent to the controllability of the fault injection in the sequential logic devices. Therefore, a full-scale gate-level fault simulation may be replaced by a significantly faster and more efficient RTL fault simulation.

In contrast to conventional fixed-fault models, the computer may execute the faster RTL simulation based upon different assumptions dictated by the level of fault tolerance desired for the IC design. In an optimistic assumption, the computer may inject stuck-at faults that have a higher observability downstream. In a less optimistic assumption, the computer may inject single event upsets based upon the sequential logic devices' register data lifetime (e.g., when the data in the sequential logic devices is being used). This type of single event upset inject may have a lower observability downstream compared to the stuck-ats. In a less pessimistic assumption, the computer may inject single event upsets based upon a toggling of a combination logic device in the corresponding COIs during gate-level functional simulation. Therefore, there is some correlation between the injected fault and the workload executed by the IC design thereby providing some level of observability. In a pessimistic mode, the computer may randomly inject single event upsets that has the lowest observability compared to the aforementioned fault injections. The fault simulations disclosed herein are further more accurate than conventional fault simulation sampling and estimation techniques that rely on unduly restrictive distribution models such as hypergeometric distribution models and normal distribution models.

As used herein, observability is generally a likelihood that a fault injected at a certain point in an IC can be observed at an observation point downstream. Faults with higher observability are more likely to be detected than faults with lower observability. Controllability, as used herein, is the degree of ease in providing control inputs in an IC design. A higher controllability means that inputs can be easily provided into the IC design and vice versa.

FIG. 1 shows an illustrative electronic design automation (EDA) system 100 for functional and safety verification of an IC design, according to an embodiment. The EDA system 100 may include any number of computing devices: this embodiment includes a client computing device 101 and a server 102. Furthermore, one or more components of the electronic design automation system 100 may be grouped and referred to as an electronic design automation tool (or EDA tool). For example, the client computing device 101 may be executing a first subset of software modules of the EDA tool and the server 102 may be executing a second subset of software modules forming the EDA tool. As shown, the client computing device 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (UDP), and IEEE communication protocols.

A client computing device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may communicate with the one or more servers (e.g., server 102) of the system 100 through one or more networks 105, using wired and/or wireless communication capabilities. A user interface 104 in the client computing device 101 may include a Graphical User Interface (GUI) that presents an interactive, graphical representation of an IC design, layout, schematic, or other logical representation of an IC that is being synthesized, designed, and optimized using an IC synthesis tool 103 and verified using an IC design verification tool 107. For example, the GUI 104 may provide an interface for a circuit designer to provide and edit functional specifications of an IC using a hardware description language such as VHDL, Verilog, or SystemC. Furthermore, the GUI 104 may provide interactive elements such as buttons or icons for the circuit designer to enter and/or modify the functional specifications written in the hardware description language. The designer may also use the GUI 104 to provide synthesis commands to the system, which may be text-based commands or graphical commands such as a click of a button. The GUI 104 may further provide an interface or interactive elements for the circuit designer to use the IC design verification tool 107 to perform a functional and safety verification of the IC design.

As described above, the server 102 may be accessible to the client device 101 via one or more networks 105. The server 102 may be any computing device comprising a processor and other computing hardware configured to execute software modules of the IC synthesis tool (e.g., EDA synthesis software) that may generate a gate level design from a hardware level description of the design written in, e.g., VHDL, Verilog, or SystemC. The computing hardware may further be configured to execute software modules of the IC design verification tool 107 to perform functional and safety verification of the IC design synthesized by the IC synthesis tool 103. In operation, the circuit designer may interact with the IC synthesis tool 103 and the IC design verification tool 107 through a number of input devices of the client device 101, such as by inputting a selection as with a mouse or inputting a request as with a keyboard. The IC synthesis tool 103 and the IC design verification tool 107 may generate any number of GUI responses based on the inputs received from the client device 101, and then send the response data back to the client device 101 to be presented on the GUI 104.

The server 102 may include a design library 106 that is accessed by the IC synthesis tool 103. The design library 106 may include instances of various circuit devices used to design an IC. Non-limiting examples of circuit devices may include sequential devices (e.g., D flip-flops, T flip-flops, SR flip flops, JK flip-flops), combination logic gates (e.g., AND, OR, NOT, NOR, NAND, XOR), wires (also referred to as nets), and multiplexers, among others. In some embodiments, the design library 106 may include instances of standard cells (also referred to as cells) used by the IC synthesis tool 103 to generate an IC design. An instance of a cell may represent electronic circuit components such as a transistor, transmission line, or an optical fiber line. The design library 106 may include macros (or macroblocks) formed by a plurality of components. The IC synthesis tool 103, based upon instructions from a circuit designer, may invoke instances of macros to be placed in their entireties in the IC design. A macro may be, for example, a memory block, a third-party block, or an IP block, each configured to provide a generally complex functionality (e.g., more complex than a combination logic gate). In addition, the design library 106 may include instances of input-output (TO) pins that the IC synthesis tool 103 may invoke to be placed at the boundary edges of the IC design. The IC synthesis tool 103 may therefore use instances of cells or any other types of design instances in the design library 106 to generate a netlist of an IC.

The IC design verification tool 107 may perform functional and safety verification of the IC design synthesized by the IC synthesis tool 103. Functional verification includes verifying the operations of the IC design under normal conditions. Safety verification includes verifying the operations of the IC design under error conditions, e.g., in response to injection of faults. For safety verification, the IC design verification tool 107 may first perform a static gate-level COI analysis for faults injected into combinational logic elements in the IC design. The IC design verification tool 107 may then perform an RTL simulation of sequential elements in the IC design based upon approximating faults in the combinational components in the gate-level analysis with faults in the sequential logic elements in the RTL simulation.

The illustrative system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities). Furthermore, the system 100 with the IC synthesis tool 103, the design library 106, IC design verification tool 107 located at the server 102 is merely for illustration and at least a portion of one or more of the IC synthesis tool 103, the design library 106, IC design verification tool 107 may be within the client computing device 100.

Figure 2:
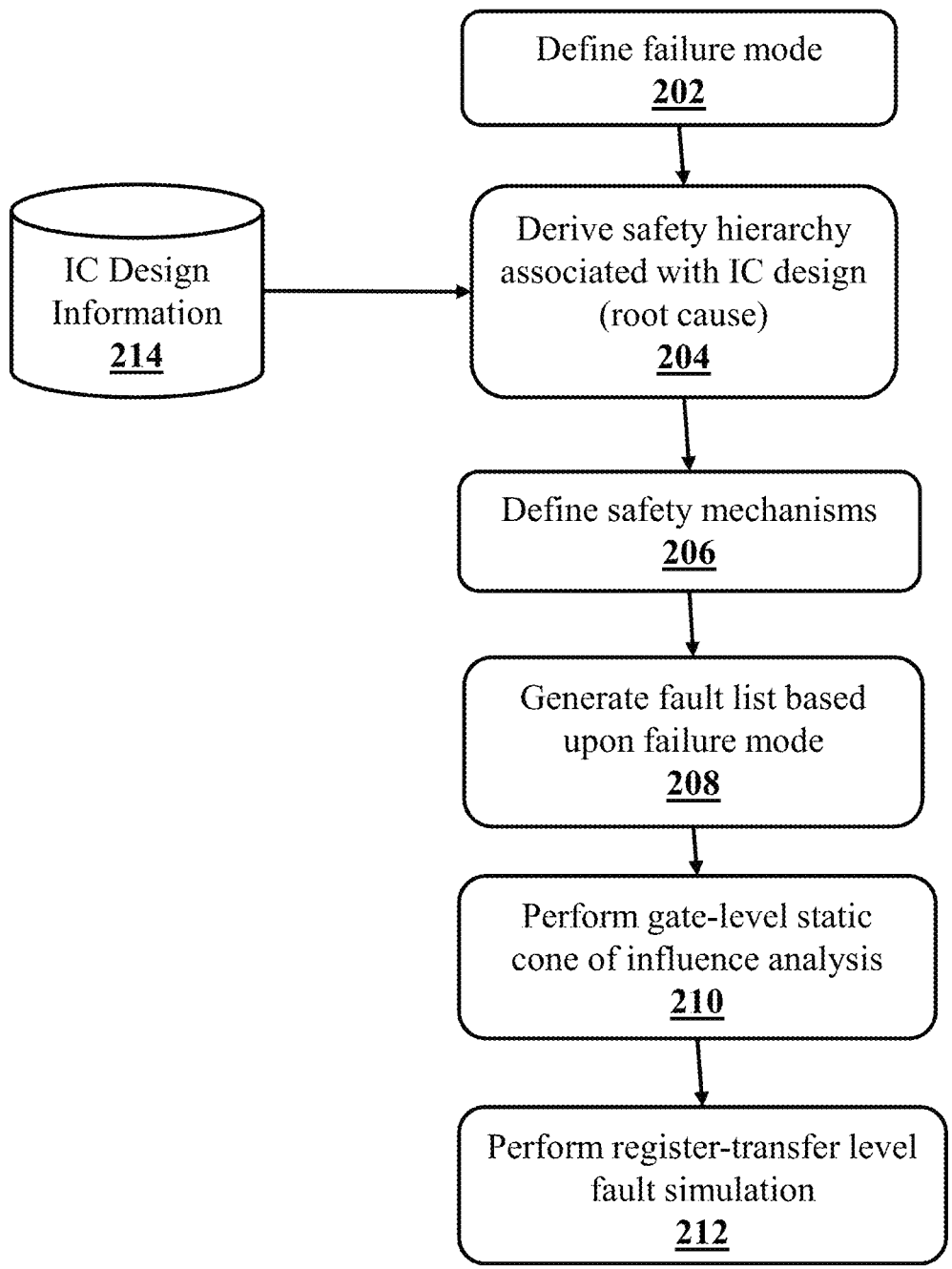
FIG. 2 shows a flow diagram of an illustrative method of fault simulation of an IC design, according to an embodiment.

FIG. 2 shows a flow diagram of an illustrative method 200 of fault simulation, according to an embodiment. It should be understood that the steps of the method 200, shown in FIG. 2 and described herein, are merely illustrative and additional, alternate, and fewer number of steps should be considered within the scope of this disclosure.

The method 200 may begin at step 202 where a failure mode may be defined. A failure mode may be a textual sentence that represents a way in which a design function may fail when exposed to gate faults. At step 204, a safety hierarchy associated with an IC design is derived from IC design information 214 associated with the IC design. This derivation is based upon a part of the textual sentence that specifies a function of the IC design that may activate a failure mode. The specified function of the IC design may also be referred to as a root cause logic. The remaining part of the textual sentence may describe the effect cause by the root cause logic, e.g., "wrong data caused by fault in the adder." At step 206, a safety mechanism against the failure mode may be defined. It should be understood that the method 200 is directed towards verifying the functionality of the safety mechanism by estimating the safety mechanism's DC. At step 208, a fault list based upon the failure mode may be generated. The fault lists may include portions of IC that may behave erroneously based upon the faulty root cause logic. At step 210, a computer may perform a gate-level COI analysis. By performing a gate-level COI analysis, the computer may determine downstream static behavior of the fault. For example, the computer may determine whether a fault at a combinational logic is dangerous for a downstream sequential logic. At step 212, the computer may perform register-transfer level (RTL) fault simulation. Based upon the RTL fault simulation, the computer may calculate observability of a plurality of faults as the faults travel downstream through the sequential logic elements. In other words, the computer may approximate faults in the combinational logic at step 210 with faults at the sequential logic in step 212. Based upon such approximation, the computer may perform fault simulation significantly faster than the conventional fault simulation techniques (performed on gate-level netlists).

Figure 3:
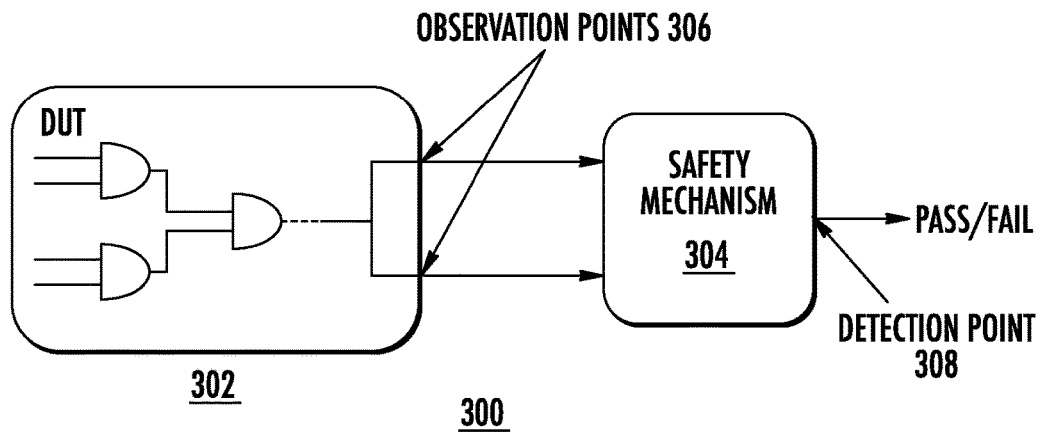
FIG. 3 shows an illustrative fault simulation environment, according to an embodiment.

FIG. 3 shows an illustrative fault simulation environment 300, according to an embodiment. It should be understood that the fault simulation environment 300 is merely for illustration and ease of explanation and should not be considered limiting. As shown, the fault simulation environment may include a device under test (DUT) 302 and a safety mechanism 304. The DUT 302 may be a portion of an IC design containing a plurality of combinational logic and sequential logic elements. In some embodiments, the DUT 302 may be the entire IC design. Regardless of whether the DUT 302 is a whole or a partial IC design, a computer may inject one or more faults within the DUT 302 for simulation.

To calculate the DC of the safety mechanism 304, the computer may receive a workload (e.g., logic executed by the DUT during normal operations) to execute during simulation, identification of observation points 306, and identification of a detection point 308. The observation points 306 are the locations within the DUT 302 or connected to the DUT 302 where the computer may observe the downstream effects of faults injected in the DUT 302. The detection point 308 is where the computer may observe the reaction of the safety mechanism 304. The safety mechanism 304 may generate an alarm that may trigger a notification of the fault condition. Using the detection point 308, the computer may verify if the safety mechanism 304 fails or passes based on whether the safety mechanism 304 provide an appropriate response (e.g., generate an alarm) to the fault condition in the DUT 302. Although FIG. 3 shows two observation points 306 and a detection point 308, these are merely for the ease of explanation and any number of observation points and detection points within the fault simulation environment 300 should be considered within the scope of this disclosure.

Embodiments disclosed herein apply the principle of decomposition of observability and controllability of with respect to the detection point 308 in two different parts as described below. For example, the faults from each of the observation points 306 may travel to the safety mechanism through two different paths (e.g., a first and a second path) even when these faults may have arisen at a single upstream location. Therefore, the observability of the fault at the detection point 308 may be a combination of observability of the fault through the first path and observability of the fault through the second path.

Figure 4:
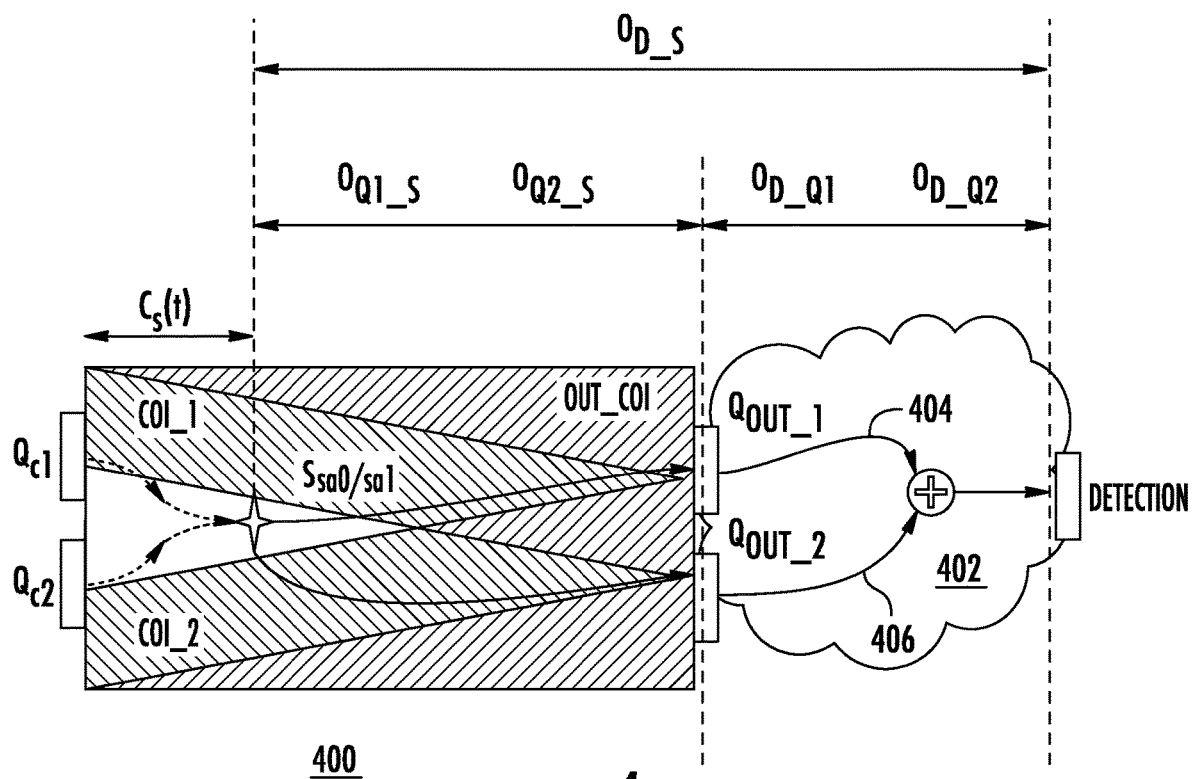
FIG. 4 shows an illustrative fault simulation flow, according to an embodiment.

FIG. 4 shows an illustrative fault simulation flow 400, according to an embodiment. The fault simulation flow 400 is based upon applying the principle of decomposition of observability and controllability with respect to a detection point in two different paths, as detailed below. It should be understood that the fault simulation flow 400 shown in FIG. 4 and described below is merely for explanation purposes only and should not be considered limiting. It should further be understood that the fault simulation flow 400 may be a part of a more sophisticated fault simulation flow being executed by a computer on an IC design. It should further be understood that the fault simulation flow 400 may be a composite of a gate-level static COI analysis and a RTL level simulation. For example, a computer may inject a fault S at combinational logic during a gate-level static COI analysis and approximate S with the states of downstream flip-flops during an RTL level simulation.

In the fault simulation flow 400, the fault S is shown to be propagated to a detection point D. The structural setup for the fault simulation flow 400 includes a flip-flop $Q_{out\_1}$ that has an upstream cone of influence COI_1 and another flip-flop $Q_{out\_2}$ that has an upstream cone of influence COI_2. Following the cone of influence COI_1, a state of the downstream flip-flop $Q_{out\_1}$ is affected by the output of an upstream flip-flop $Q_{c1}$ and combinational logic in between, and may also be affected by the output of upstream flip-flop $Q_{c2}$. Similarly, following the cone of influence COI_2, a state of the downstream flip-flop $Q_{out\_2}$ is affected by the output of an upstream flip-flop $Q_{c2}$ and combinational logic in between, and may also be affected by the output of upstream flip-flop $Q_{c1}$. Therefore, a fault injected into $Q_{c1}$ (or a combinational logic within the COI of $Q_{c1}$) may propagate to $Q_{out\_1}$ and $Q_{out\_2}$. Another fault injected into $Q_{c2}$ (or a combinational logic within the COI of $Q_{c2}$) may propagate to $Q_{out\_1}$ and $Q_{out\_2}$. Additionally, a fault injected in between $Q_{c1}$ and $Q_{out\_1}$ within COI_1 may propagate to $Q_{out\_1}$ and $Q_{out\_2}$ and another fault injected in between $Q_{c2}$ and $Q_{out\_2}$ within COI_2 may propagate to $Q_{out\_1}$ and $Q_{out\_2}$. Outputs from the flip-flops $Q_{out\_1}$, $Q_{out\_2}$ may pass through combination logic 402. The detection point D at the end of the combination logic 402 may detect the propagation of the faults from the flip-flops $Q_{out\_1}$, $Q_{out\_2}$.

As shown, the fault S may be injected at a location in both cone of influences COI_1, COI_2. The fault S may be, for example, a stuck-at 0 sa0 or stuck-at 1 sa1. Based on the injection of the fault S, the following symbols may be defined: (i) $O_{Q\_S}$: Observability of S fault with respect to Q (e.g., corresponding probabilities of detecting S at the downstream flip-flops $Q_{out\_1}$, $Q_{out\_2}$); (ii) $O_{D\_Q}$: Observability of Q fault with respect to D (e.g., corresponding probabilities of detecting faults at flip-flops $Q_{out\_1}$, $Q_{out\_2}$ at D); (iii) $O_{D\_S}$: observability of S fault with respect to D (e.g., a probability of detecting S fault at D); and (iv) controllability of S fault Cs(t) (e.g., indicating the degree of flexibility of injecting the S fault).

Mathematically, the observability of S fault with respect to the detection point D may be expressed as:

$$O_{D\_S} = (O_{Q1\_S} * O_{Q2\_S}) * (O_{D\_Q1} * O_{D\_Q2}) * Cs(t)$$

It should be noted that that controllability factor Cs(t) depends upon time. Cs(t) may generally be related to workload, which may be associated with the ability of a testbench to stimulate or stress the IC with S fault at the shown point in FIG. 4. However, embodiments disclosed herein leverage an approximation: that controllability of S can be approximated as the controllability of the flip-flops $Q_{out\_1}$, $Q_{out\_2}$. In other words, controllability of faults at combinational logic at a gate-level static analysis can be approximated as controllability of faults at sequential logic containing the combinational logic in the corresponding COIs during RTL simulation. Therefore, the above equation may be approximated as follows:

$$O_{D\_S}=(O_{Q1\_S}*O_{Q2\_S})*(O_{D\_Q1}*O_{D\_Q2})*Cs(t)\approx$$
$$(O_{Q1\_s}*O_{Q2\_s})*[(O_{D\_Q1}*O_{D\_Q2})*C_Q(t)]$$

The DC calculations for the fault simulation flow 400 may therefore be based upon various controlled injections of faults to the flip-flops $Q_{out\_1}$, $Q_{out\_2}$ (or generally sequential logic), which may travel to the detection point D from the two paths 404, 406 in the combination logic 402. The injections of the faults may be based upon the following alternative assumptions.

Optimistic Assumption

The controllability of S may be replaced with stuck-ats at flip-flops $Q_{out\_1}$, $Q_{out\_2}$. For example each of the flip-flops $Q_{out\_1}$, $Q_{out\_2}$ may be injected with a stuck-at 0 (sa0) or stuck-at 1 (sa1). Mathematically, $$Cs(t) \approx C_{Q\_SA0/SA1}$$

The optimistic assumption is implied because the stuck-at faults injected at the flip-flops $Q_{out\_1}$, $Q_{out\_2}$ may be detected at the detection point D independent of the workload during an RTL fault simulation flow 400.

Less Optimistic Assumption

The controllability of S may be replaced with one or more single event upsets (SEUs) on the flip-flops $Q_{out\_1}$, $Q_{out\_2}$. A SEU may be an undesired bit flip on the flip-flops $Q_{out\_1}$, $Q_{out\_2}$. In a fabricated IC, the SEU may be caused by, for example, errant radiation striking the IC. The SEUs may be generated according to register data lifetime (RDL). RDL of each flip-flop can be extracted from one RTL functional simulation. RDL generally indicates different stages of the flip-flops $Q_{out\_1}$, $Q_{out\_2}$ as data is being written to and read out of the flip-flops $Q_{out\_1}$, $Q_{out\_2}$. An illustrative RDL may include stages such as "register not allocated," "pre-write," "data being used" (e.g., being read from), and "post last read." SEU injections may be performed when the data in the flip-flops $Q_{out\_1}$, $Q_{out\_2}$ are used. Mathematically, $$Cs(t) \approx SEU_{Q\_RDL}(t)$$

The less-optimistic is implied because of the injection of the fault when the data in the flip-flops $Q_{out\_1}$, $Q_{out\_2}$ are actually being used and not at other stages such as pre-write. Therefore, there will be some probability (less than that of the optimistic assumption with a higher probability of stuck-ats propagating downstream) that the injected SEU may be detected at the detection point D.

Less Pessimistic Assumption

The controllability of S is replaced with one or a list of SEUs on the flip-flops $Q_{out\_1}$, $Q_{out\_2}$ when S toggles in a gate-level functional simulation. The SEU is injected in the corresponding flip-flop at the same time of the S toggling. Mathematically, $$CS(t) \approx SEU_Q(S_{toggle}(t))$$

There is still some probability (less than the one less optimistic assumption) of correlation of toggling of S in gate-level functional simulation and data at the flip-flops $Q_{out\_1}$, $Q_{out\_2}$ being used (e.g., being read out). In other words, there is some probability that the fault injected in the $Q_{out\_1}$, $Q_{out\_2}$ during the same time as the toggling of S may be detected at D because there is some correlation of workload (indicated by toggling of S) and injection of the fault at $Q_{out\_1}$, $Q_{out\_2}$.

Pessimistic Assumption

The controllability of S is replaced with one or a list of random SEUs on the flip-flops $Q_{out\_1}$, $Q_{out\_2}$. Mathematically, $$Cs(t) \approx SEU_Q(\text{random})$$

In this case the SEUs are injected in a not correlated way with respect to the workload so that the probability to observe them on the detection point D is reduced.

Embodiments disclosed herein therefore provide flexibility fault-simulation under one or more of the aforementioned assumptions based upon the desired fault tolerance. For example, an IC design that may not have to be highly fault tolerant may be simulated under the optimistic assumption. However, an IC design that may have to highly fault tolerant may be simulated under pessimistic assumption to get to a safety mechanism with a higher DC even under the conditions imposed by the pessimistic assumption.

Figures 5A, 5B:
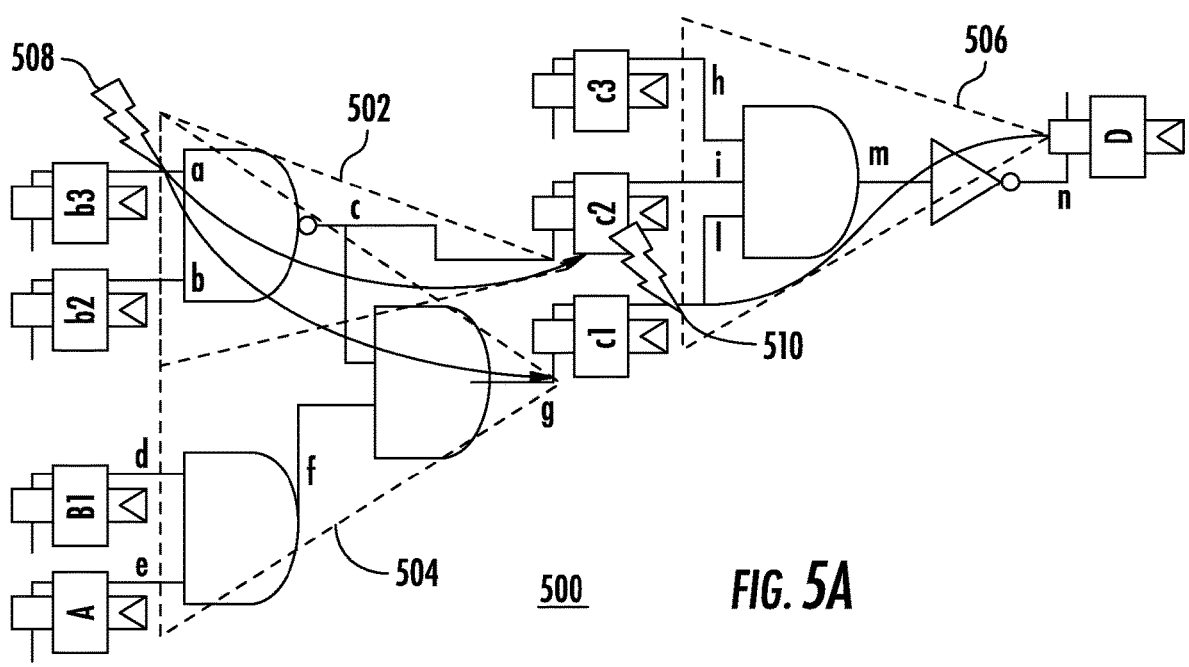
FIG. 5A shows an illustrative flow of static analysis of a gate-level netlist of an IC design, according to an embodiment.
FIG. 5B shows an illustrative observability table for a COI of a flip-flop, according to an embodiment.

FIG. 5A shows an illustrative flow 500 of a static analysis of a gate-level netlist of an IC design, according to an embodiment. Although the static analysis flow 500 may be performed by a plurality of computers, the following description details a computer performing the entirety of the flow 500. Furthermore, it should be understood that the flow 500 is merely for illustration and explanation and should not be considered limiting.

The circuit devices in a portion of an IC design implementing the flow 500 may include synchronous (or sequential) devices such as flip-flops A, B1, b2, b3, c1, c2, c3, D. In addition to the synchronous devices, the portion of the IC design may include combination logic devices such as logic gates (AND and NOT gates shown for illustration). Each of the flip-flops A, B1, b2, b2, c1, c2, c3, D may have a cone of influence (COI). For the purposes of the describing the flow 500, three illustrative COIs 502, 503, 504 are shown. More specifically, the COI 502 may be associated with flip-flop c2; the COI 504 may be associated with the flip-flop c1; the COI 506 may be associated with the flip-flop D. The IC design implementing the flow 500 may further include wires carrying signals between the various sequential and combinational devices within the IC. For example, wire a carries signal from flip-flop b3, wire b carries signals from flip-flop b2, wire d carries signals from flip-flop B1, and wire e carries signals from flip-flop A. Similarly wire c carries signals to flip-flop c2 and wire g carries signals to flip-flop c1. Moving downstream, wire h carries signals from flip-flop c3, wire i carries signals from flip-flop c2, wire m carries signals from a combination logic gate that perform logical operations on signals received from wires h, i, j, and wire n carries signal from the combinational logic gate that performs signal received from wire m to flip-flop D. The computer may inject controlled faults at any portion of the IC design. For illustration, FIG. 5 shows injection of two faults: fault 508 at wire a and fault 510 at wire 1.

In the flow 500, the computer may statically analyze observability of faults (e.g., faults 508, 510) in the cones of influence of each of the flip-flops c1, c2, D. For example, the computer may inject a stuck-at fault (sa1 or sa0) at a location in the IC design and observe its propagation downstream. For an observability analysis, the computer may prove that there exists at least one workload pattern that can propagate a fault to downstream flip-flops. Based upon the observability analysis, the computer may generate an observability table for each cone of influence.

FIG. 5B shows an illustrative observability table 512 for a COI 504 of flip-flop c1. Within the observability table 512, column 514 shows the faults injected at different locations at the IC circuit. Column 516 shows the effect of the injected faults when the state of the flip-flop c1 is 1. Column 518 shows the effect of the injected faults when the state of the flip-flop c1 is 0. Each of the rows 520a-520m (collectively or commonly referred to as 520) shows the effect of a corresponding injected fault at the COI 504 for the flip-flop c1. The effect may indicate whether the injected fault is safe or dangerous. A fault is dangerous when it can propagate to the flip-flop from the corresponding COI. A fault is safe when there is no workload pattern that may control and propagate the injected fault from the COI to the corresponding flip-flop. For example, as indicated by row 520a, a stuck-at 0 fault injected at wire a is safe for each binary state of the flip-flop c1. However, as indicated by row 520b, a stuck-at 1 fault injected at the wire a is dangerous when the state of flip-flop c1 is 1 but safe when the binary state of the flip-flop c1 is 0. As another example, a struck-at 0 fault inserted at wire e is dangerous for each binary state of the flip-flop c1 as indicated by row 520h.

Figures 5C, 6:
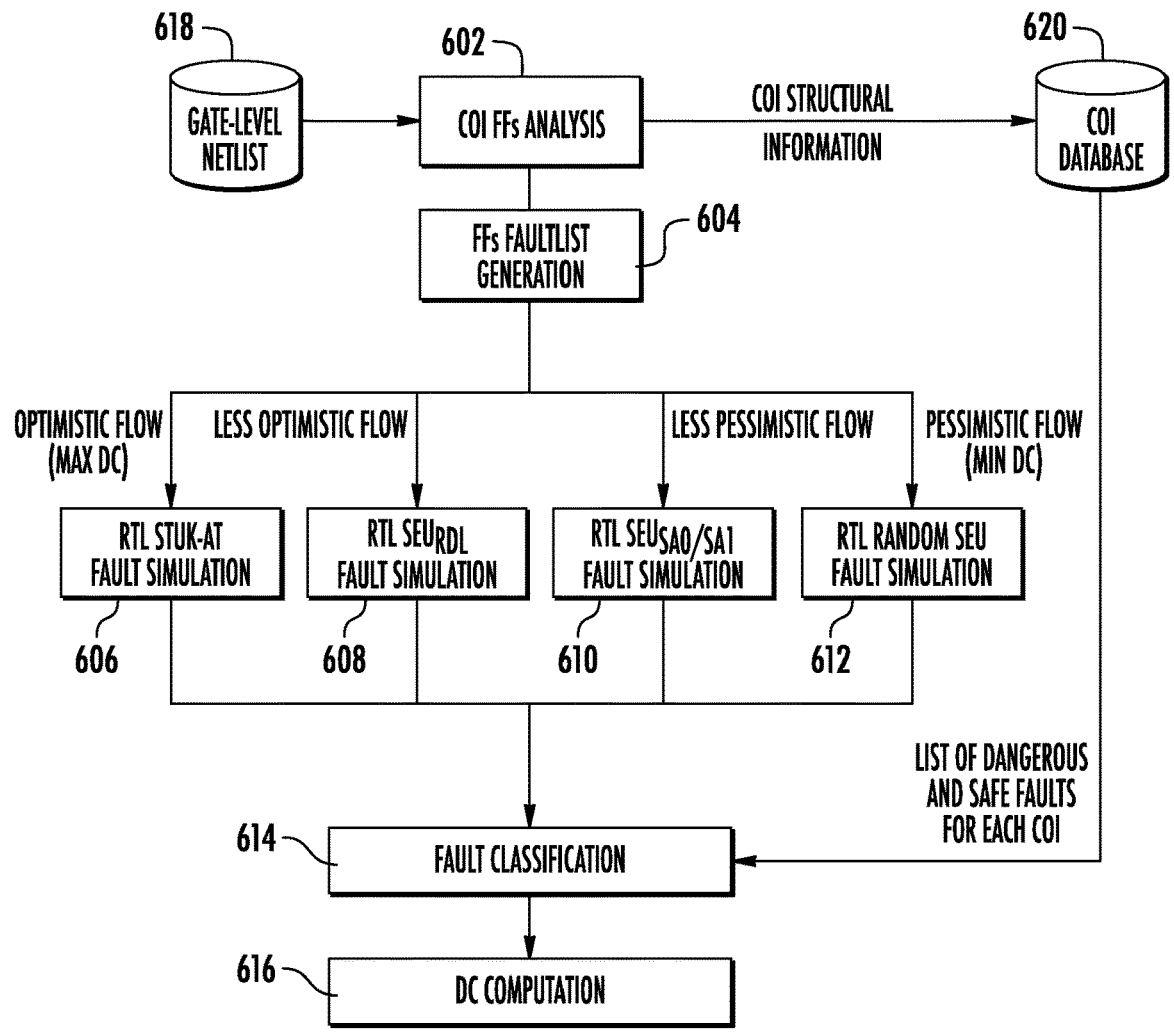
FIG. 5C shows a second illustrative observability table for a COI of a second flip-flop, according to an embodiment.
FIG. 6 shows a flow diagram of an illustrative method 600 of a safety verification of an IC design, according to an embodiment.

FIG. 5C shows an illustrative observability table 522 for a COI 502 of flip-flop c2. Within the observability table 522, column 524 shows the faults injected at different locations at the IC circuit. Column 526 shows the effect of the injected faults when the state of the flip-flop c2 is 1. Column 528 shows the effect of the injected faults when the state of the flip-flop c2 is 0. Each of the rows 530a-530e (collectively or commonly referred to as 530) shows the effect of a corresponding injected fault at the COI 502 for the flip-flop c2. The effect may indicate whether the injected fault is safe or dangerous. A fault is dangerous when it can propagate to the flip-flop from the corresponding COI. A fault is safe when there is no workload pattern that may control and propagate the injected fault from the COI to the corresponding flip-flop. For example, as indicated by row 530c a stuck-at 0 fault injected at wire b is safe for each binary state of the flip-flop c2. However, as indicated by row 530b, a stuck-at 1 fault injected at the wire a is dangerous when the state of flip-flop c2 is 1 but safe when the binary state of the flip-flop c2 is 0. As another example, a struck-at 0 fault inserted at wire c is dangerous for each binary state of the flip-flop c2 as indicate by row 530d.

FIGS. 5B-5C further illustrate that some faults may appear as safe in one COI and appear dangerous at another cone of influence. For example, the stuck-at 0 fault on wire a is safe at the COI 504 for flip-flop c1 as indicated by row 520a of the observability table 512 but is dangerous at COI 502 for flip-flop c2 as indicated by row 530a of the observability table 522. Some faults may dangerous on multiple COIs. For example, stuck-at 1 fault for wire c is dangerous in the COI 504 of flip-flop c1 as indicated by row 520e of the observability table 512 and also dangerous in the COI 502 for flip-flop c2 as indicated by row 530e of the observability table 522.

The computer may generate a fault list for each flip-flop (e.g., c1, c2) based upon the corresponding observability tables (e.g., 512, 522). The computer may generally generate a fault list for each flip-flop based on operation of equivalence. More specifically, if a fault is dangerous in only one cone of influence, the computer may represent the fault (e.g., a stuck-at or SEU) on the corresponding flip-flop. Alternatively, if the faults are dangerous across many cones of influence (e.g., stuck-at 1 on wire c), the computer may represent multiple faults injected simultaneously on the corresponding flip-flops. The fault-list generated will be a list of $n_{faults}$ containing: (i) single SEU or stuck-at for each flip-flop, and (ii) multiple SEUs or multiple stuck-ats to inject simultaneously based upon the propagation of the fault across multiple flip-flops.

The computer may perform an RTL fault simulation based upon the generated fault-lists. During the RTL fault simulation, the computer may capture corresponding observability of faults in flip-flops with respect to the detection points ($O_{D\_Q}$). The computer may further capture masking effects due to combination of patterns related to the workload from the flip-flops up to the detection point. The computer may further approximate the controllability of the faults by the controllability of the flip-flops according to different levels of accuracy based upon the different RTL fault simulations.

For an optimistic assumption, the computer when performing RTL fault simulation injects stuck-at faults on the flip-flops. This can be considered the maximum value of the DC range. For a less optimistic assumption, the computer performing the RTL faults simulation may inject SEUs on the flip-flops considering the RDL. The computer may extract the RDL from an RTL functional simulation and used to setup the SEU time injection. For a less pessimistic assumption, computer may inject SEUs on the flip-flops considering its temporal toggling. For a pessimistic assumption, computer may inject in random way SEUs of the flip-flops. This can be considered the minimum value of the DC range.

The computer may combine the results of RTL simulations with the observability table for each cone of influence to classify the faults in the corresponding COIs. Embodiments herein assume multiple injected faults in different flip-flops are unique faults. For a mathematical model, variables for calculating DC may be defined as follows:

$T_f$: Total number of faults in a COI;
$T_d$: Total number of faults classified dangerous from the static COI analysis;
$T_s$: Total number of faults classified safe from the static COI analysis;
$f_s$: Percentage of $T_f$ that are safe;
$f_{dd}$: Percentage of $T_f$ that are detected during RTL simulation; and
$f_{ud}$: Percentage of $T_f$ that are undetected during RTL simulation For one or more stuck-at faults that are detected by the computer during the RTL fault simulation, all dangerous faults in the COIs ($n_{COI}$=number of COIs where the faults are observed from static gate-level analysis) of flip-flops may be considered detected. Mathematically, the classification may be expressed as follows.

$$f_{dd} = \sum_{k=0}^{n_{COI}} T_{d_k}$$

$$f_s = \sum_{k=0}^{n_{COI}} T_{s_k}$$

$$f_{ud} = 0$$

For the one or more stuck-at faults that are not detected by the computer during the RTL fault simulation, all dangerous faults in the flip-flops may be considered undetected. Mathematically, the classification may be expressed as follows:

$$f_{dd} = 0$$

$$f_s = \sum_{k=0}^{n_{COI}} T_{s_k}$$

$$f_{ud} = \sum_{k=0}^{n_{COI}} T_{d_k}$$

For the one or more stuck-at faults that are safe, the computer may consider undetected all dangerous faults in the COIs of the flip-flops. Mathematically, the classification may be expressed as follows:

$$f_{dd} = 0$$

$$f_s = \Sigma_{k=0}^{n_{COI}} T_{s_k} + \Sigma_{k=0}^{n_{COI}} T_{d_k}$$

$$f_{ud} = 0$$

For one or more SEUs detected by the computer during RTL fault simulation, the computer may perform the following classification. If the percentage DD % of the SEUs are detected, the classification may be mathematically expressed as follows:

$$f_{dd} = DD\% * \sum_{k=0}^{n_{COI}} T_{d_k}$$

$$f_s = \sum_{k=0}^{n_{COI}} T_{s_k}$$

$$f_{ud} = (1 - DD\%) * \sum_{k=0}^{n_{COI}} T_{d_k}$$

For the case where all SEUs are safe, the classification may be mathematically expressed as follows:

$$f_{dd} = 0$$

$$f_s = \Sigma_{k=0}^{n_{COI}} T_{s_k} + \Sigma_{k=0}^{n_{COI}} T_{d_k}$$

$$f_{ud} = 0$$

For the cases where the computer does not detect all SEUs during the RTL fault simulation, the classification may be mathematically expressed as follows:

$$f_{dd} = 0$$

$$f_s = \sum_{k=0}^{n_{COI}} T_{s_k}$$

$$f_{ud} = \sum_{k=0}^{n_{COI}} T_{d_k}$$

Based upon the above classifications, the DC of the safety mechanism according to the following expression. Mathematically.

$$DC = \frac{\sum_{k=0}^{n_{fault}} f_{dd} + \sum_{k=0}^{n_{fault}} f_s}{\sum_{k=0}^{n_{fault}} f_{ud} + \sum_{k=0}^{n_{fault}} f_{dd} + \sum_{k=0}^{n_{fault}} f_s}$$

Qualitatively, DC may be defined by the ratio of detected and safe faults to the total number of faults. The total number of faults include undetected faults, detected faults, and safe faults. $n_{fault}$ is the total number of single or multiple stuck-at or SEU injected in the sequential element.

FIG. 6 shows a flow diagram of an illustrative method 600 of a safety verification of an IC design, according to an embodiment. It should be understood that the steps shown in FIG. 6 and described herein are merely illustrative and additional, alternative, and fewer number of steps should also be considered within the scope of this disclosure. Although multiple computers may perform different steps of the method, the following describes a single computer executing all the steps of the method 600.

The method 600 may begin at step 602 where the computer may retrieve a gate-level netlist 618 of an IC design and perform a static COI analysis for the flip-flops (or sequential/synchronous logic elements) in the IC design. Based upon the COI analysis, the computer may determine influence of faults in upstream combinational logic for the corresponding flip-flops. In other words, based upon the static COI analysis, the computer may determine the propagation structure of the faults from the combinational logic to the sequential logic. Based upon the propagation structure, the computer may determine faults as "safe" and "dangerous." The computer may generate COI tables for the flip-flops containing data records with the aforementioned structural information and store the COI tables in a database 620.

At a next step 604, the computer generate fault-list for the flip-flops in the IC design. For example, the computer may generate a fault for a flip-flop based upon a fault injected in a corresponding COI during the static COI analysis. Therefore, the fault-list for the flip-flops is based upon the assumption that the controllability of a fault in a combinational logic approximated as controllability of a fault in a sequential logic containing the combinational logic in the sequential logic's COI. The computer may execute the next alternative steps 606, 608, 610, 610 of RTL simulation based upon corresponding assumptions dictated by the level of fault-tolerance required for the IC design. D In the next alternative step 606 based upon an optimistic assumption, the computer may execute an RTL simulation injected stuck-at faults in the flip-flops. The stuck-at faults have a higher probability of downstream propagation and therefore a higher detectability. Out of all the assumptions, the optimistic assumption may generate a higher value of DC.

In the next alternative step 608 based upon a less-optimistic assumption, the computer may inject SEUs based upon RDLs of the corresponding flip-flops. More particularly, the computer may inject the faults when the data from the flip-flops are being used within the IC design. Therefore, there may be some probability that that the injected faults may propagate downstream to the detection points.

In a next alternative step 610 based upon a less-pessimistic assumption, the computer may inject faults on the flip-flops at the same time of toggling of a fault injection point in an upstream combinational logic (e.g., within the corresponding COIs) during gate-level functional simulation.

Therefore, there may be some correlation between the fault in the combinational logic during static analysis and fault in the downstream sequential logic during RTL simulation. However the probability of downstream propagation of the fault and therefore the observability may be lower than that of the less-optimistic assumption.

In a next alternative step 612 based upon a pessimistic assumption, the computer may randomly inject faults at the flip-flops. There may be correlation between a workload and the randomly injected faults thereby decreasing the probability of the downstream propagation of the fault. The pessimistic assumption generally yields the lowest DC.

At a next step 614, the computer may classify faults based upon the results of one or more of the RTL simulation steps 606, 608, 610, 612 and the COI tables sore in the COI database 620. The classification may include detected faults, undetected faults, and safe faults.

At step 620, the computer may calculate the DC of a safety mechanism in the IC circuit based upon the classification at step 614. The DC may be a ratio of safe and detected faults to total number of faults. A higher DC may indicate the IC design may has a high fault tolerance and a lower DC may indicate that the IC design has a low fault tolerance.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   performing, by a computer, a static cone of influence analysis on a gate-level netlist of an IC design to generate a fault-list for sequential logic devices of the IC design;
   simulating, by the computer, the IC design at register-transfer level by injecting faults from the fault-list into the sequential logic devices to determine corresponding observability of the injected faults; and calculating, by the computer, a diagnostic coverage of a safety mechanism in the IC design based upon the determined observability of the injected faults during the register-transfer level simulation.

2. The computer-implemented method of claim 1, wherein the injected faults are stuck-at faults.

3. The computer-implemented method of claim 1, wherein the injected faults are single event upsets.

4. The computer-implemented method of claim 3, further comprising:

injecting, by the computer during the register-transfer level simulation, the single event upsets based upon corresponding register data lifetimes of the sequential logic devices.

5. The computer-implemented method of claim 3, further comprising:

injecting, by the computer during the register-transfer level simulation, the single event upsets based upon toggling of combinational logic devices in the corresponding cones of influence of the sequential logic devices at the time of a gate-level functional simulation of the IC design.

6. The computer-implemented method of claim 3, further comprising:

randomly injecting, by the computer during the register-transfer level simulation, the single event upsets into the sequential logic devices.

7. The computer-implemented method of claim 1, wherein the observability of the injected faults indicate probabilities of the safety mechanism detecting the injected faults.

8. The computer-implemented method of claim 1, wherein controllability of injecting the faults into the sequential logic devices during the register-transfer level simulation approximate controllability of injecting faults into combinational logic devices in corresponding cones of influence.

9. The computer-implemented method of claim 1, further comprising:

generating, by the computer, observability tables for corresponding cones of influence for the sequential logic devices, the observability tables indicating whether the faults in the fault-list are safe or dangerous for the corresponding sequential logic devices.

10. The computer-implemented method of claim 9, further comprising:

calculating, by the computer, the diagnostic coverage of the safety mechanism based upon the determined observability of the injected faults and observability tables for the corresponding cones of influence.

11. A system comprising:

a non-transitory storage medium storing a plurality of computer program instructions;

a processor electrically coupled to the non-transitory storage medium and configured to execute the plurality of computer program instructions to:

perform a static cone of influence analysis on a gate-level netlist of an IC design to generate a fault-list for sequential logic devices of the IC design;

simulate the IC design at register-transfer level by injecting faults from the fault-list into the sequential logic devices to determine corresponding observability of the injected faults; and calculate a diagnostic coverage of a safety mechanism in the IC design based upon the determined observability of the injected faults during the register-transfer level simulation.

12. The system of claim 11, wherein the injected faults are stuck-at faults.

13. The system of claim 11, wherein the injected faults are single event upsets.

14. The system of claim 13, wherein the processor is configured to further execute the computer program instructions to:

inject during the register-transfer level simulation, the single event upsets based upon corresponding register data lifetimes of the sequential logic devices.

15. The system of claim 13, wherein the processor is configured to further execute the computer program instructions to:

inject during the register-transfer level simulation, the single event upsets based upon toggling of combinational logic devices in the corresponding cones of influence of the sequential logic devices at the time of a gate-level functional simulation of the IC design.

16. The system of claim 13, wherein the processor is configured to further execute the computer program instructions to:

randomly inject during the register-transfer level simulation, the single event upsets into the sequential logic devices.

17. The system of claim 11, wherein the observability of the injected faults indicate probabilities of the safety mechanism detecting the injected faults.

18. The system of claim 11, wherein controllability of injecting the faults into the sequential logic devices during the register-transfer level simulation approximate controllability of injecting faults into combinational logic devices in corresponding cones of influence.

19. The system of claim 11, wherein the processor is configured to further execute the computer program instructions to:

generate observability tables for corresponding cones of influence for the sequential logic devices, the observability tables indicating whether the faults in the fault-list are safe or dangerous for the corresponding sequential logic devices.

20. The system of claim 19, wherein the processor is configured to further execute the computer program instructions to:

calculate the diagnostic coverage of the safety mechanism based upon the determined observability of the injected faults and observability tables for the corresponding cones of influence.

* * * * *